United States Patent
Kang

(10) Patent No.: US 8,804,043 B2
(45) Date of Patent: Aug. 12, 2014

(54) IMAGE DISPLAY APPARATUS HAVING A GRAPHICAL USER INTERFACE FOR A PLURALITY OF INPUT PORTS AND METHOD FOR OPERATING THE SAME

(71) Applicant: Sungsuk Kang, Seoul (KR)

(72) Inventor: Sungsuk Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/834,383

(22) Filed: Mar. 15, 2013

(65) Prior Publication Data
US 2014/0176801 A1 Jun. 26, 2014

(30) Foreign Application Priority Data
Dec. 26, 2012 (KR) ........................ 10-2012-0153436

(51) Int. Cl.
*H04N 5/445* (2011.01)
*H04N 5/268* (2006.01)
*H04N 9/74* (2006.01)
*G06F 3/048* (2013.01)

(52) U.S. Cl.
USPC ............................ 348/584; 348/564; 348/706

(58) Field of Classification Search
USPC ......... 348/705, 706, 588, 565, 564, 584, 589, 348/600; 710/8, 15–19, 62–64; 345/629, 345/634, 641; 715/764–766, 788, 790, 793, 715/794, 797, 810, 828, 835, 838
See application file for complete search history.

(56) References Cited

U.S. PATENT DOCUMENTS

| | | | | |
|---|---|---|---|---|
| 5,793,366 A | * | 8/1998 | Mano et al. | 715/839 |
| 6,313,880 B1 | * | 11/2001 | Smyers et al. | 348/552 |
| 6,333,739 B1 | * | 12/2001 | Koyama et al. | 715/744 |
| 6,825,858 B2 | * | 11/2004 | Sato | 715/735 |
| 7,124,367 B2 | * | 10/2006 | Anderson et al. | 715/735 |
| 7,231,603 B2 | * | 6/2007 | Matsumoto | 715/716 |
| 7,779,361 B2 | * | 8/2010 | Malmstrom | 715/764 |
| 2002/0033848 A1 | * | 3/2002 | Sciammarella et al. | 345/838 |
| 2004/0017513 A1 | * | 1/2004 | Takahashi | 348/552 |
| 2005/0193015 A1 | * | 9/2005 | Logston et al. | 707/104.1 |
| 2006/0230360 A1 | | 10/2006 | Young et al. | 715/781 |
| 2008/0155615 A1 | * | 6/2008 | Craner et al. | 725/91 |

FOREIGN PATENT DOCUMENTS

| | | |
|---|---|---|
| EP | 0 843 468 A2 | 5/1998 |
| EP | 2 040 154 A2 | 3/2009 |
| EP | 2 257 049 A1 | 12/2010 |
| EP | 2 385 528 A1 | 11/2011 |
| EP | 2 445 206 A1 | 4/2012 |
| WO | WO 2012/055704 A1 | 5/2012 |

OTHER PUBLICATIONS

European Search Report dated Dec. 13, 2013 issued in Application No. 13 00 2409.

* cited by examiner

*Primary Examiner* — Victor Kostak
(74) *Attorney, Agent, or Firm* — KED & Associates, LLP

(57) ABSTRACT

An image display apparatus and a method for operating the same are disclosed. The method for operating an image display apparatus includes displaying a first image, displaying per-input port images that are being received or have been received through a plurality of input ports on a per-input port basis so that the per-input port images are distinguished from one another according to the input ports, upon receipt of a per-input port image view input, selecting one of the per-input port images, and displaying an image corresponding to an input port through which the selected per-input port image is being received or has been received. The per-input port images are displayed overlapped with one another.

20 Claims, 25 Drawing Sheets

IMAGE DISPLAY APPARATUS HAVING A GRAPHICAL USER INTERFACE FOR A PLURALITY OF INPUT PORTS AND METHOD FOR OPERATING THE SAME

CROSS-REFERENCE TO RELATED APPLICATION

This application claims the benefit of Korean Patent Application No. 10-2012-0153436, filed on Dec. 26, 2012 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which can increase user convenience.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can readily display input images.

In accordance with an aspect of the present invention, the above and other objects can be accomplished by the provision of a method for operating an image display apparatus, including displaying a first image, displaying per-input port images that are being received or have been received through a plurality of input ports on a per-input port basis so that the per-input port images are distinguished from one another according to the input ports, upon receipt of a per-input port image view input, selecting one of the per-input port images, and displaying an image corresponding to an input port through which the selected per-input port image is being received or has been received. The per-input port images are displayed overlapped with one another.

In accordance with another aspect of the present invention, there is provided an image display apparatus including a display to display a first image, an interface unit having a first plurality of input ports, to receive per-input port images through a second plurality of input ports, and a controller to upon receipt of a per-input port image view input, control display of per-input port images that are being received or have been received through the second plurality of input ports on a per-input port basis so that the per-input port images are distinguished from one another according to the input ports, and when one of the per-input port images is selected, to control display of an image corresponding to an input port through which the selected per-input port image is being received or has been received. The per-input port images are displayed overlapped with one another.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function. Thus the image display apparatus may have user-friendly interfaces such as a handwriting input device, a touch screen, or a three-dimensional (3D) pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS).

That is, various applications can be freely added to or deleted from a general-purpose OS kernel in the image display apparatus according to the present invention. Therefore, the image display apparatus may perform a number of user-friendly functions. The image display apparatus may be, for example, a smart TV.

Figure 1:
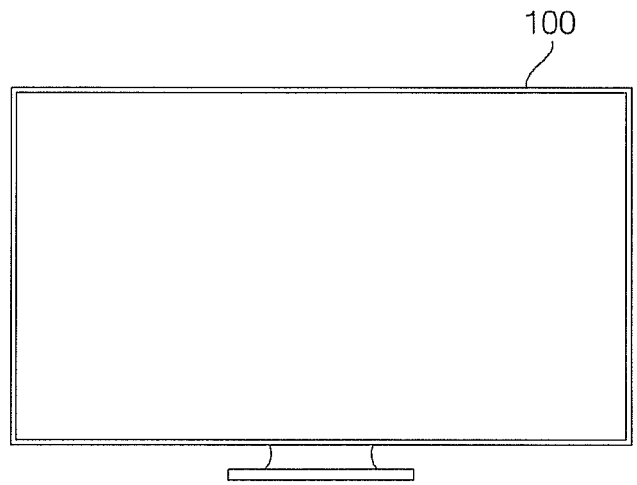
FIG. 1 illustrates an image display apparatus according to an embodiment of the present invention.

FIG. 1 illustrates an image display apparatus according to an embodiment of the present invention.

Referring to FIG. 1, an image display apparatus 100 may receive various input images through a plurality of input ports.

In accordance with an embodiment of the present invention, upon receipt of an input for viewing images on a per-input port basis (hereinafter, referred to as a per-input port image view input), the image display apparatus 100 may separately display images that are being received or have been received through input ports, on a per-input port basis.

That is, upon receipt of a per-input port image view input, the image display apparatus 100 may display images that are being received or have been received through input ports in such a manner that the images can be distinguished from one another according to the input ports. The simplified display of input images in the image display apparatus 100 increases user convenience.

A plurality of images received through a plurality of input ports may be displayed distinctively from one another, overlapped with one another. Since the images can be displayed at the same time in this manner, the image display apparatus 100 can increase user convenience.

Upon selection of one of the images received through the input ports, the image display apparatus 100 displays the selected image full-screen, thereby allowing the user to view the image readily.

If any of a plurality of input ports provides recorded images, the image display apparatus 100 displays the images received from the input port only when playback of the images is not completed. Thus, the user can readily identify only input images to view.

Display of images on a per-input port basis in response to a per-input port image view input according to an embodiment of the present invention will be described in detail later with reference to FIGS. 8 to 12C.

Figure 2:
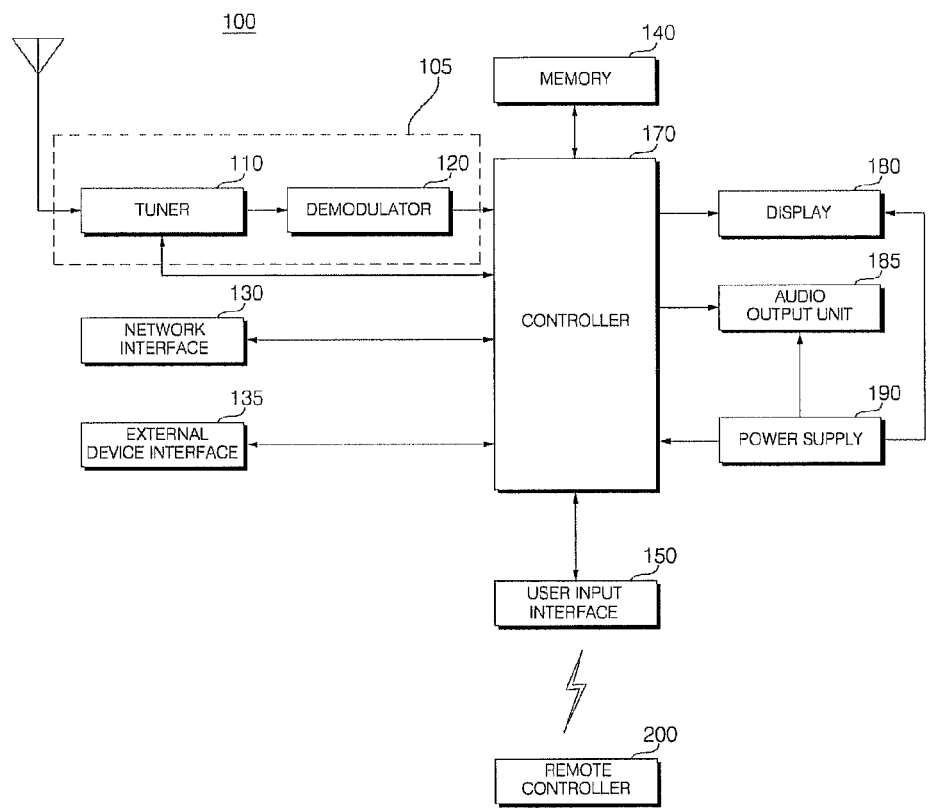
FIG. 2 is a block diagram of the image display apparatus illustrated in FIG. 1.

FIG. 2 is a block diagram of the image display apparatus illustrated in FIG. 1.

Referring to FIG. 2, the image display apparatus 100 according to an embodiment of the present invention includes a broadcasting receiver 105, a network interface 130, an external device interface 135, a memory 140, a user input interface 150, a controller 170, a display 180, an audio output unit 185, and a power supply 190. The broadcasting receiver 105 may include a tuner 110 and a demodulator 120. When needed, the broadcasting receiver 105 may further include the network interface 130.

The tuner 110 selects a Radio Frequency (RF) broadcast siyiial corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 135 may serve as an interface between a connected external device and the image display apparatus 100. For interfacing, the external device interface 130 may include an A/V Input/Output (I/O) unit (not shown).

The external device interface 130 may be connected to an external device such as a Digital Versatile Disk (DVD) player, a Blu-ray player, a game console, a camera, a camcorder, a computer (e.g., a laptop computer), or a set-top box, wirelessly or by wire. Then, the external device interface 130 may transmit and receive signals to and from the external device.

In order to allow input of video and audio signals from the external device to the image display apparatus 100, the A/V I/O unit of the external device interface 130 may include a Universal Serial Bus (USB) port, a Composite Video Banking Sync (CVBS) port, a Component port, an S-Video port (analog), a Digital Visual Interface (DVI) port, a High Definition Multimedia Interface (HDMI) port, a Red, Green, Blue (RGB) port, and a D-SUB port.

In addition, the external device interface 135 may be connected to various set-top boxes through at least one of the above-described ports to transmit signals to or receive signals from the set-top boxes.

The network interface 135 serves as an interface between the image display apparatus 100 and a wired/wireless network such as the Internet. The network interface 135 may receive content or data from the Internet, a Content Provider (CP), or a Network Provider (NP) over a network.

The network interface 130 may access a specific Web page over a connected network or another network linked to the connected network. That is, the network interface 130 may access a specific Web page over a network and may transmit data to or receive data from a server. Besides, the network interface 130 may receive content or data from a CP or an NP.

Further, the network interface 130 may selectively receive an intended application from among applications open to the public through a network.

The network interface 130 may include a wired communication module (not shown) and a wireless communication module (not shown).

The wireless communication module of the network interface 130 may perform short-range wireless communication with other electronic devices. The image display apparatus 100 may be connected to other electronic devices over a network in conformance to communication standards such as Bluetooth, Radio Frequency Identification (RFID), Infrared Data Association (IrDA), Ultra WideBand (UWB), ZigBee, Digital Living Network Alliance (DLNA), etc.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store an application or an application list received from the external device interface 135 or the network interface 130.

The image display apparatus 100 may open a content file (e.g. a video file, a still image file, a music file, a text file, an application file, etc.) to the user.

While the memory 140 is shown in FIG. 2 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from the remote controller 200, provide the controller 170 with user input signals received from local keys (not shown), such as inputs of a power key, a channel key, a volume key, and a setting key, transmit a control signal received from a sensor unit (not shown) for sensing a user gesture to the controller 170, or transmit a signal received from the controller 170 to the sensor unit.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 2, the controller 170 may include a demultiplexer (DEMUX) and a video processor, which will be described later with reference to FIG. 3.

In addition, the controller 170 may provide overall control to the image display apparatus 100. For example, the controller 170 may control the tuner 110 to tune to an RF broadcast signal corresponding to a user-selected channel or a pre-stored channel.

The controller 170 may control the image display apparatus 100 according to a user command received through the user input interface 150 or according to an internal program. Especially, the controller 170 may connect to a network and download a user-intended application or application list to the image display apparatus 100 through the network.

For example, the controller 170 receives a signal of a channel selected according to a specific channel selection command received through the user input interface 150 by controlling the tuner 110 and processes a video, audio or data signal of the selected channel. The controller 170 outputs information about the user-selected channel along with the processed video or audio signal to the display 180 or the audio output unit 185.

In another example, the controller 170 outputs a video or audio signal received from an external device, for example, a camera or a camcorder according to an external device video play command received through the user input interface 150 to the display 180 or the audio output unit 185.

The controller 170 may also control the display 180 to display images. The image displayed on the display 180 may be a two-Dimensional (2D) or 3D still image or video.

The controller 170 may control a particular object in the image displayed on the display 180 to be rendered as a 3D object. For example, the particular object may be at least one of a linked Web page (e.g. of a newspaper, a magazine, etc.), an Electronic Program Guide (EPG), a menu, a widget, an icon, a still image, a video, or text.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

Upon selection of an application view menu item, the controller 170 may control display of an application or application list that are available in the image display apparatus or can be downloaded from an external network.

The controller 170 may control installation and execution of applications downloaded from the external network as well as various User Interfaces (UIs). The controller 170 may also control display of an image related to an executed application on the display 180 according to user selection.

The display 180 generates drive signals by converting a processed video signal, a processed data signal, and an On Screen Display (OSD) signal received from the controller 170 or a video signal and a data signal received from the external device interface 135 to RGB signals.

The display 180 may be various types of displays such as a Plasma Display Panel (PDP), a Liquid Crystal Display (LCD), an Organic Light-Emitting Diode (OLED) display, and a flexible display. The display 180 may also be capable of displaying 3D images.

The display 180 may also be a touch screen that can be used not only as an output device but also as an input device.

The audio output unit 185 may receive a processed audio siynal from the controller 170 and output the received audio signal as voice.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For the transmission of a user input, the remote controller 200 may operate in conformance to various communication standards such as Bluetooth, RF, IR, UWB, and ZigBee.

In addition, the remote controller 200 may receive a video signal, audio signal and/or data signal from the user input interface 150 and output the received signal as an image, sound, or vibrations.

The remote controller 200 may transmit coordinate information corresponding to its movement to the image display apparatus 100 so that a pointer may be displayed in correspondence with the movement of the remote controller 200 on the display 180 of the image display apparatus 100. Since a pointer is displayed at a shifted position according to movement in a 3D space, the remote controller 200 may be referred to as a 3D pointing device.

The block diagram of the image display apparatus 100 illustrated in FIG. 2 is an exemplary embodiment of the present invention. The image display apparatus 100 is shown in FIG. 2 as having a number of components in a given configuration. However, the image display apparatus 100 may include fewer components or more components than those shown in FIG. 2 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Unlike the configuration illustrated in FIG. 2, the image display apparatus 100 may be configured so as to receive and playback a broadcast video through the network interface 130 or the external device interface 135, without the tuner 110 and the demodulator 120.

Figure 3:
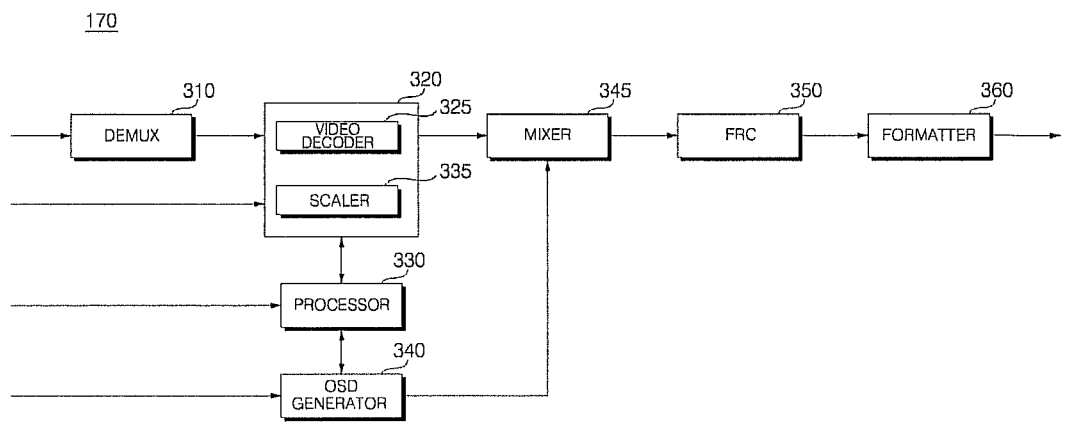
FIG. 3 is a block diagram of a controller illustrated in FIG. 2.

FIG. 3 is a block diagram of the controller illustrated in FIG. 2.

Referring to FIG. 3, the controller 170 may include a DEMUX 310, a video processor 320, a processor 330, an OSD generator 340, a mixer 350, a Frame Rate Converter (FRC) 355, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The video signal decoded by the video processor 320 is provided to the mixer 350.

The processor 330 may provide overall control to the image display apparatus 100 or the controller 170. For example, the processor 330 may control the tuner 110 to tune to RF broadcasting corresponding to a user-selected channel or a pre-stored channel.

The processor 330 may also control the image display apparatus 100 according to a user command received through the user input interface 150 or an internal program. The processor 330 may control data transmission through the network interface 130 or the external device interface 135.

The processor 330 may control operations of the DEMUX 310, the video processor 320, and the OSD generator 340 in the controller 170.

The OSD generator 340 generates an OSD signal autonomously or according to user input. For example, the OSD generator 340 may generate signals by which a variety of information is displayed as images or text on the display 180, according to user input signals or control signals. The OSD signal may include various data such as a UI screen, a variety of menu screens, widgets, icons, etc.

For example, the OSD generator 340 may generate a signal by which captions are displayed for a broadcast image or EPG-based broadcasting information.

Considering that the OSD generator 340 generates an OSD signal or a graphic signal, the OSD generator 340 may be referred to as a graphic processor.

The mixer 350 may mix the decoded video signal received from the video processor 220 with the OSD signal received from the OSD generator 340 and output the mixed signal to the formatter 360. As the decoded broadcast video signal or the external input signal is mixed with the OSD signal, an OSD may be overlaid on the broadcast image or the external input image.

The FRC 355 may change the frame rate of an input image. It is also possible for the FRC 355 to simply output the input image without frame rate conversion.

The formatter 360 changes the format of the signal received from the FRC 355 to be suitable for the display 180. For example, the formatter 360 may convert a received signal into an RGB data signal. The RGB data signal may be output in the form of a Low Voltage Differential Signal (LVDS) or mini-LVDS.

The formatter 360 may change the format of a 3D video siynal or convert a 2D image to a 3D image. The audio processor (not shown) of the controller 170 may process the demultiplexed audio signal. For audio signal processing, the audio processor may have a plurality of decoders.

The audio processor of the controller 170 may also adjust the bass, treble or volume of the audio signal.

The data processor (not shown) of the controller 170 may process the data signal obtained by demultiplexing the input stream signal. For example, if the data siynal is an encoded signal, the data processor may decode the data siynal. The coded data signal may be an EPG which includes broadcast information specifying the start time, end time, etc. of scheduled broadcast TV or radio programs.

The block diagram of the controller 170 illustrated in FIG. 3 is an embodiment of the present invention. Depending upon the specifications of the controller 170, the components of the controller 170 may be combined, or omitted. Or new components are added to the controller 170.

Particularly, the FRC 350 and the formatter 360 may be configured separately outside the controller 170.

Figure 4:
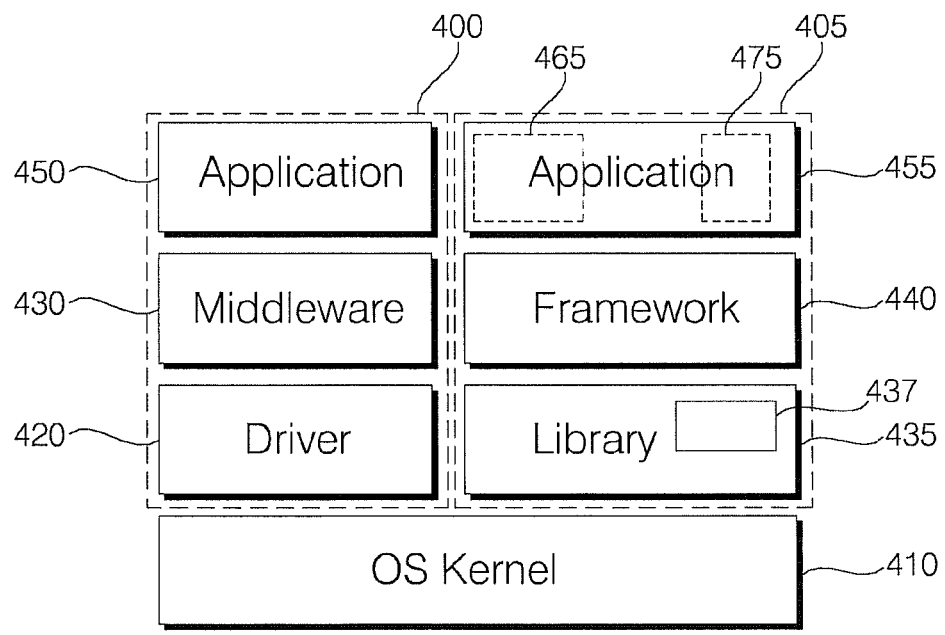
FIGS. 4 and 5 illustrate exemplary smart system platform architectures for the image display apparatus illustrated in FIG. 2.
Figure 5:
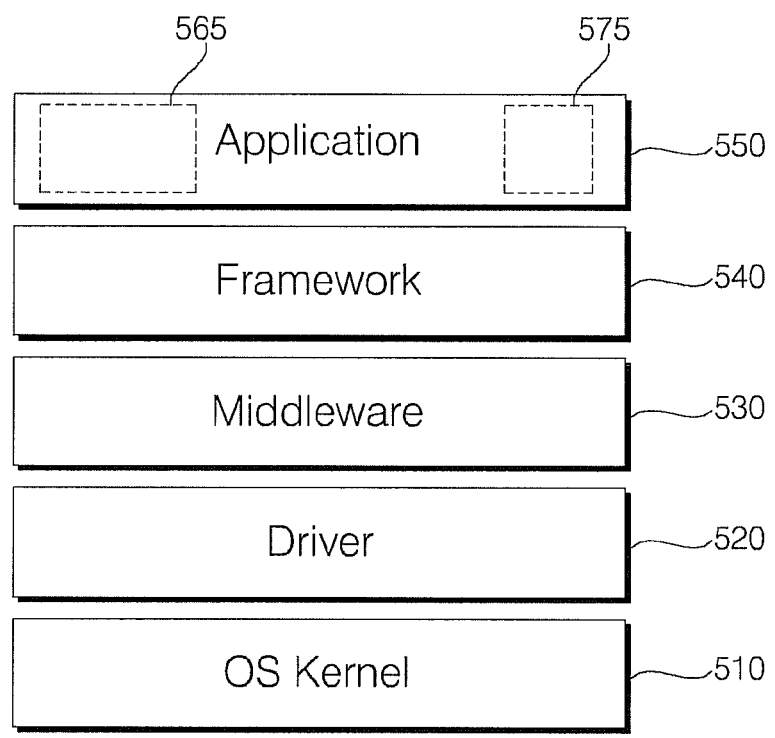

FIGS. 4 and 5 illustrate exemplary platform architectures for the image display apparatus illustrated in FIG. 2.

A platform for the image display apparatus 100 may have OS-based software to implement the above-described various operations according to an embodiment of the present invention.

Referring to FIG. 4, a platform for the image display apparatus 100 is a separate type according to an embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410. On the other hand, the smart system platform 405 may include a stack of a library 435, a framework 440, and an application layer 455 on the OS kernel 410.

The OS kernel 410 is the core of an OS. When the image display apparatus 100 is driven, the OS kernel 410 may be responsible for operation of at least one of hardware drivers, security protection for hardware and processors in the image display apparatus 100, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wireless Fidelity (Wi-Fi) driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering as much data as a unit, because data is transmitted in blocks. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUR, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410. In addition, the driver 420 may further include a driver for the remote controller 200, especially a 3D pointing device to be described below. The 3D pointing device driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus 100. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 above the framework 440 includes a variety of programs that are executed and displayed in the image display apparatus 100. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus 100.

With the applications of the application layer 455, a variety of functions such as Internet telephony, Video ON Demand (VOD), Web album, Social Networking Service (SNS), Location-Based Service (LBS), map service, Web browsing, and application search may be performed through network access. In addition, other functions such as gaming and schedule management may be performed by the applications.

Referring to FIG. 5, a platform for the image display apparatus 100 according to another embodiment of the present invention is an integrated type. The integrated platform may include an OS kernel 510, a driver 520, middleware 530, a framework 540, and an application layer 550.

Compared to the separate-type platform illustrated in FIG. 4, the integrated-type platform is characterized by the absence of the library 435 and the application layer 550 being an integrated layer. The driver 520 and the framework 540 correspond to the driver 420 and the framework 440 of FIG. 4, respectively.

The library 435 of FIG. 4 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus 100 and user-installable or user-deletable applications 575 that are downloaded from an external device or a network and stored in the image display apparatus 100.

The platforms illustrated in FIGS. 4 and 5 may be general-purpose ones that can be implemented in many other electronic devices as well as in the image display apparatus.

The platforms illustrated in FIGS. 4 and 5 may be stored or loaded in the memory 140, the controller 170, or any other processor (not shown).

Figure 6:
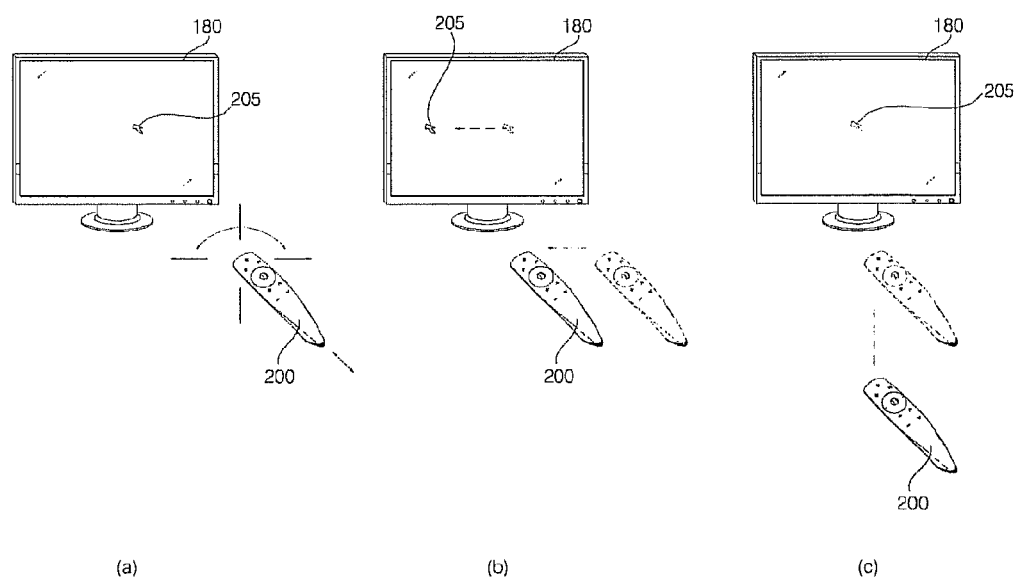
FIG. 6 illustrates a method for controlling a remote controller illustrated in FIG. 2.

FIG. 6 illustrates a method for controlling the remote controller illustrated in FIG. 2.

FIG. 6(*a*) illustrates a pointer 205 representing movement of the remote controller 200 displayed on the display 180.

The user may move or rotate the remote controller 200 up and down, side to side (FIG. 6(*b*)), and back and forth (FIG. 6(*c*)). Since the pointer 205 moves in accordance with the movement of the remote controller 200 in 3D space, the remote controller 200 may be referred to as a pointing device or 3D pointing device.

Referring to FIG. 6(*b*), if the user moves the remote controller 200 to the left, the pointer 205 also moves to the left on the display 180.

A sensor of the remote controller 200 detects the movement of the remote controller 200 and transmits motion information corresponding to the result of the detection to the image display apparatus 100. Then, the image display apparatus 100 determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus 100 then displays the pointer 205 at the calculated coordinates.

Referring to FIG. 6(*c*), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. The opposite case is also possible. That is, when the remote controller 200 recedes from the display 180, the selection area may be zoomed out and when the remote controller 200 approaches the display 180, the selection area may be zoomed in.

With the predetermined button pressed on the remote controller 200, the up, down, left and right movements of the remote controller 200 may be ignored. That is, when the remote controller 200 recedes from or advances toward the display 180, only the back and forth movements of the remote controller 200 may be sensed, while the up, down, left and right movements of the remote controller 200 may be ignored. Unless the predetermined button is pressed in the remote controller 200, the pointer 205 may move in accordance with the up, down, left or right movement of the remote controller 200.

The speed and direction of the pointer 205 may correspond to the speed and direction of the remote controller 200.

Figure 7:
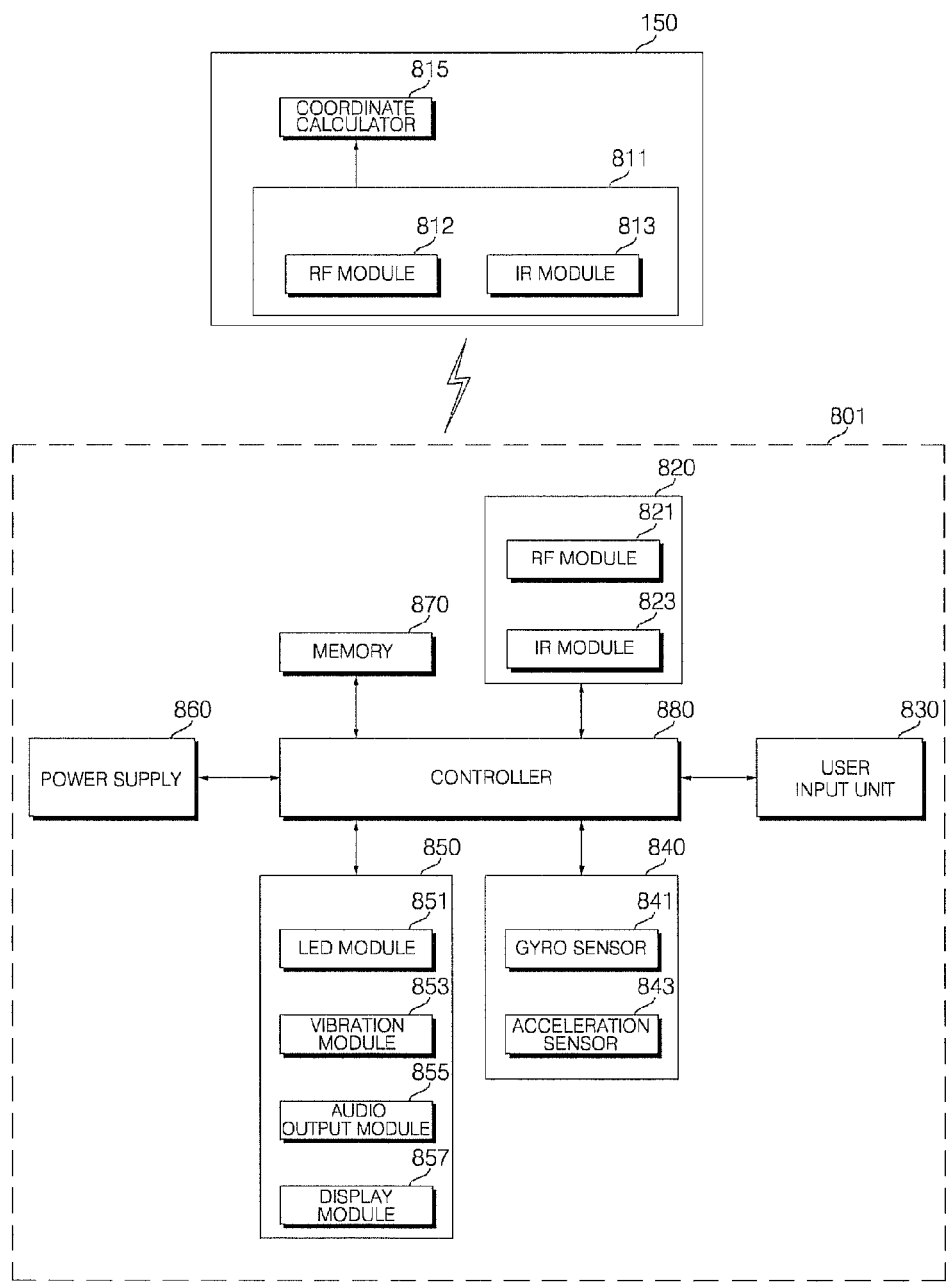
FIG. 7 is a block diagram of the remote controller illustrated in FIG. 2.

FIG. 7 is a block diagram of the remote controller illustrated in FIG. 2.

Referring to FIG. 7, the remote controller 200 may include a wireless communication module 820, a user input unit 830, a sensor unit 840, an output unit 850, a power supply 860, a memory 870, and a controller 880.

The wireless communication module 820 transmits signals to and receives signals from one of the afore-described image display apparatuses according to embodiments of the present invention. The following description will be given in the context of the image display apparatus 100.

In the embodiment of the present invention, the wireless communication module 820 may include an RF module 821 for transmitting RF signals to and/or receiving RF signals from the image display apparatus 100 according to an RF communication standard. The wireless communication module 820 may also include an IR module 823 for transmitting IR signals to and/or receiving IR signals from the image display apparatus 100 according to an IR communication standard.

The remote controller 200 may transmit motion information regarding its movement to the image display apparatus 100 through the RF module 821.

The remote controller 200 may also receive signals from the image display apparatus 100 through the RF module 821. The remote controller 200 may transmit commands, such as a power on/off command, a channel switching command, or a sound volume change command, to the image display apparatus 100 through the IR module 823, as needed.

The user input unit 830 may include a keypad, a plurality of buttons, a touch pad, and/or a touch screen. The user may enter commands to the image display apparatus 100 by manipulating the user input unit 830. If the user input unit 830 includes a plurality of hard-key buttons, the user may input various commands to the image display apparatus 100 by pressing the hard-key buttons. Alternatively or additionally, if the user input unit 830 includes a touch screen displaying a plurality of soft keys, the user may input various commands to the image display apparatus 100 by touching the soft keys. The user input unit 830 may also include various input tools other than those set forth herein, such as a wheel key, a scroll key and/or a jog key, which should not be construed as limiting the present invention.

The sensor unit 840 may include a gyro sensor 841 and/or an acceleration sensor 843. The gyro sensor 841 may sense the movement of the remote controller 200

For example, the gyro sensor 841 may sense the movement of the remote controller 200, for example, in X-, Y-, and Z-axis directions, and the acceleration sensor 843 may sense the moving speed of the remote controller 200. The sensor unit 840 may further include a distance sensor for sensing the distance between the remote controller 200 and the display 180.

The output unit 850 may output a video and/or audio signal corresponding to a manipulation of the user input unit 830 or a signal transmitted by the image display apparatus 100. The user may easily identify whether the user input unit 830 has been manipulated or whether the image display apparatus 100 has been controlled based on the video and/or audio signal output from the output unit 850.

The output unit 850 may include a Light Emitting Diode (LED) module 851 which is turned on or off whenever the user input unit 830 is manipulated or whenever a signal is received from or transmitted to the image display apparatus 100 through the wireless communication module 820, a vibration module 853 which generates vibrations, an audio output module 855 which outputs audio data, and a display module 857 which outputs an image.

The power supply 860 supplies power to the remote controller 200. If the remote controller 200 is kept stationary for a predetermined time or longer, the power supply 860 may, for example, reduce or cut off supply of power to the remote controller 200 in order to save power. The power supply 860 may resume supply of power if a specific key on the remote controller 200 is manipulated.

The memory 870 may store various programs and application data for controlling or operating the remote controller 200. The remote controller 200 may wirelessly transmit signals to and/or receive signals from the image display apparatus 100 in a predetermined frequency band through the RF module 821. The controller 880 of the remote controller 200 may store information regarding the frequency band used for the remote controller 200 to wirelessly transmit signals to and/or wirelessly receive signals from the paired image display apparatus 100 in the memory 870 and may then refer to this information for use at a later time.

The controller 880 provides overall control to the remote controller 200. For example, the controller 280 may transmit a signal corresponding to a key manipulation detected from the user input unit 830 or a signal corresponding to motion of the remote controller 200, as sensed by the sensor unit 840, to the image display apparatus 100 through the wireless communication module 820.

Figure 8:
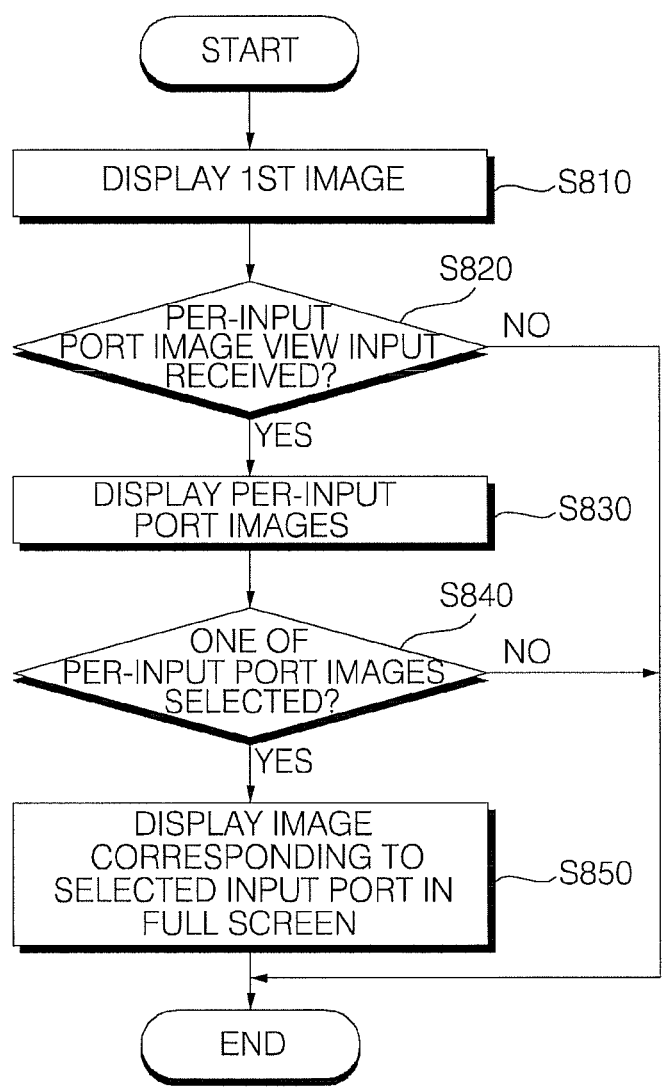
FIG. 8 is a flowchart illustrating a method for operating the image display apparatus according to an embodiment of the present invention.

FIG. 8 is a flowchart illustrating a method for operating the image display apparatus according to an embodiment of the present invention and FIGS. 9A to 12C are views referred to for describing the method for operating the image display apparatus illustrated in FIG. 8.

Referring to FIG. 8, the image display apparatus 100 displays a first image (S810). The controller 170 may control display of a content image on the display 180 according to a user input.

For example, it is possible to display various content images including a broadcast image received through the broadcasting receiver 105, an image stored in the memory 140, a menu image generated from the OSD generator 340, an external input image received through the external device interface 135, a Web page received through the network interface 130, etc.

Figure 9A:
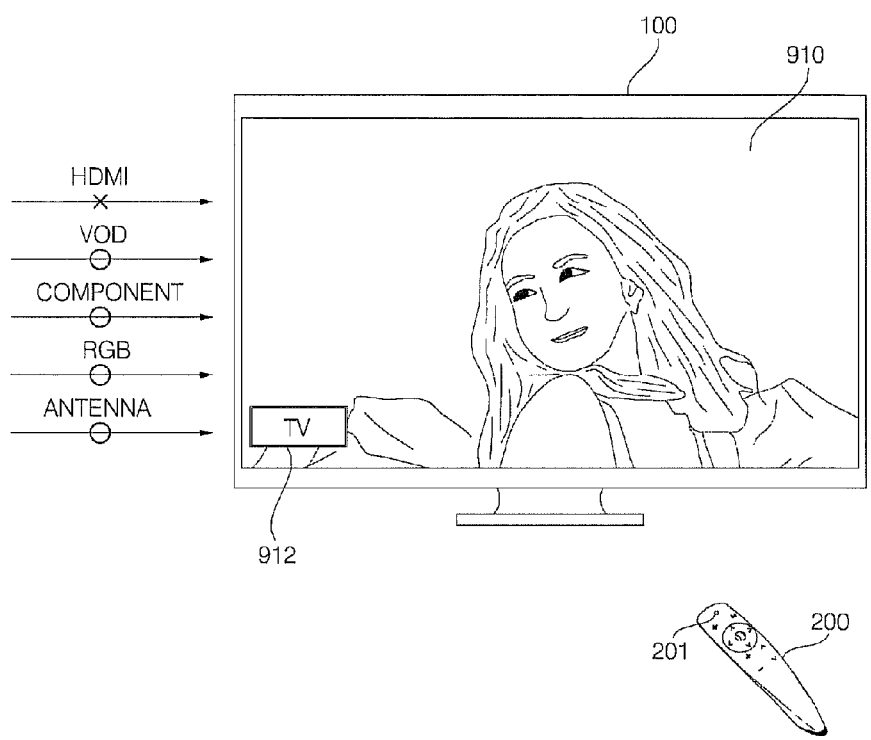
FIGS. 9A to 12C are views referred to for describing the method for operating the image display apparatus illustrated in FIG. 8.

FIG. 9A illustrates display of a broadcast image 910 in the image display apparatus 100. The broadcast image 910 may be an image corresponding to a broadcast signal received through an antenna port. The display 180 may further display an object 912 indicating a broadcast signal received through an antenna.

The image display apparatus 100 may include an interface unit having a variety of input ports. The term 'interface unit' may cover the afore-described external device interface 135, network interface 130, and broadcasting receiver 105. That is, all ports through which external images are received may collectively form the interface unit.

FIG. 9A illustrates an HDMI port, a VOD port, a Component port, an RGB port, and an antenna port among various input ports of the image display apparatus 100, by way of example. In the illustrated case of FIG. 9A, no image is received through the HDMI port, whereas images are received through the VOD port, the Component port, the RGB port, and the antenna port.

The HDMI port, the Component port, and the RGB port may be provided in the external device interface 135. The VOD port may reside in the wired communication module or wireless communication module of the network interface 130. The antenna port may be included in the broadcasting receiver 105.

Subsequently, the image display apparatus 100 determines whether a per-input port image view input has been received (S820). Upon receipt of the per-input port image view input, the image display apparatus 100 displays images received through a plurality of input ports (S830).

The controller 170 of the image display apparatus 100 determines whether a per-input port image view input has been received. For example, when a specific key of the remote controller 200 is manipulated, the controller 170 may determine that the per-input port image view input has been received. In another example, the controller 170 may determine whether the per-input port image view input has been received by monitoring a user voice input, a gesture, or a local key.

FIG. 9A illustrates an exemplary manipulation of an input key 201 in the remote controller 200.

Upon receipt of the per-input port image view input, the controller 170 of the image display apparatus 100 controls display of images received through respective input ports. Especially, the controller 170 may control display of images that are being received or have been received through the input ports on a per-input port basis so that the images can be distinguished from one another according to the input ports. The controller 170 may control overlapped display of the images that are being received or have been received through the input ports. Especially, the controller 170 may display images received through input ports available for image reception among a plurality of input ports, on a per-input port basis.

Figure 9B:
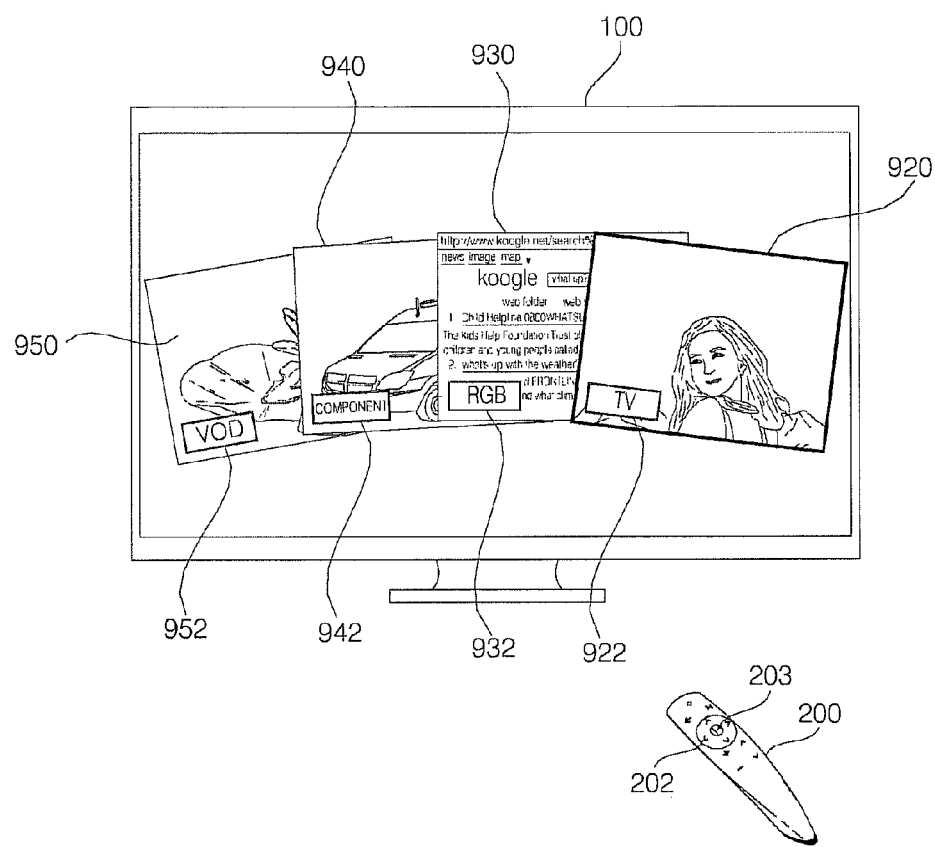

FIG. 9B illustrates an example in which a broadcast image 920 received through the antenna port, an RGB image 930 received through the RGB port, a Component image 940 received through the Component port, and a VOD image 950 received through the VOD port are displayed partially overlapped with one another according to a manipulation of the input key 201 of the remote controller 200. The images 920 to 950 may be thumbnail images. This may be referred to as card view mode for per-input port image display.

Because images received through a plurality of input ports are displayed overlapped with one another in such a manner that the images may be distinguished from one another according to the respective input ports as described above, all of the images can be displayed at one time. Therefore, user convenience can be increased.

In FIG. 9B, the broadcast image 920 corresponding to the broadcast image 910 illustrated in FIG. 9A may be highlighted to indicate that it is live. While the periphery (cursor) of the broadcast image 920 is shown in FIG. 9B as bold compared to those of the other images 930, 940 and 950, the highlight effect may be exerted in many other manners. For example, at least one of the size, periphery thickness, or brightness of the broadcast image 920 may be set to be larger than that of any other displayed image. Or the broadcast image 920 may be displayed at a foremost position on the screen.

The images 930, 940 and 950 may be still images except for the broadcast image 920. Especially, the images 930, 940 and 950 may be still images stored in the memory 140. More especially, at least one of the images 930, 940 and 950 may be a still image which is a last reproduced image displayed on the image display apparatus 100. Thus, when an external input image is displayed on the display 180, the memory 140 may capture the displayed image and store the captured image periodically. Especially, the memory 140 may store only a latest playback image through periodic storage and update.

FIG. 9B illustrates external input images that are received through currently available input ports and displayed on a per-input port basis in the image display apparatus 100. When the HDMI port is not connected to any external device as illustrated in FIG. 9A, an HDMI image is not displayed as a per-input port image. Only the broadcast image 920, the RGB image 930, the Component image 940, and the VOD image 950 received through the connected ports may be displayed as per-input port images.

When a plurality of per-input port images are displayed according to the manipulation of the input key 201 of the remote controller 200, the controller 170 may control arrangement of the images in order of the latest use.

In the illustrated case of FIG. 9B, the broadcast image 920 is placed at the foremost position, followed by the RGB image 930, the Component image 940, and the VOD image 950 in this order. It is noted from this arrangement that the broadcast image 920 is now playing through the antenna port, the RGB image 930 was reproduced through the RGB port earlier than the broadcast image 920, the Component image 940 was reproduced through the Component port earlier than the RGB image 930, and the VOD image 950 was reproduced through the VOD port earlier than the Component image 940. In this manner, the history of using external input ports is known from the image arrangement.

The controller 170 may control display of objects indicating the respective input ports corresponding to the per-input port images on the display 180.

In FIG. 9B, a 'TV' object 922 representing the antenna port, an 'RGB' object 932 representing the RGB port, a 'Component' object 942 representing the Component port, and a 'VOD' object 952 representing the VOD port are displayed over the respective images 920, 930, 940 and 950. Therefore, the user can readily identify the input ports through which the per-input port images 920 to 950 are being received or have been received.

Since all of the plurality of per-input port images 920 to 950 are displayed on the display 180 at one time, each of the per-input port images 920 to 950 illustrated in FIG. 9B is smaller than the broadcast image 910 illustrated in FIG. 9A.

If any of the images 920 to 950 is a live image while not shown in FIG. 9B, an object indicating live may be displayed over the live image.

The image display apparatus 100 determines whether one of the displayed per-input port images has been selected (S840). Upon selection of one of the displayed per-input port images, the image display apparatus 100 full-screens an image corresponding to the selected input port (S850).

Upon receipt of an input for selecting one of the displayed per-input port images, the controller 170 of the image display apparatus 100 controls display of the image corresponding to the selected input port in full screen on the display 180.

For example, the Component image 940 may be selected through manipulation of a left directional key 202 and an OK key 203 of the remote controller 200 in FIG. 9B. Specifically, the user may move a cursor to the Component image 940 by pressing the left directional key 202 twice and then may select the Component image 940 by pressing the OK key 203.

Figure 9C:
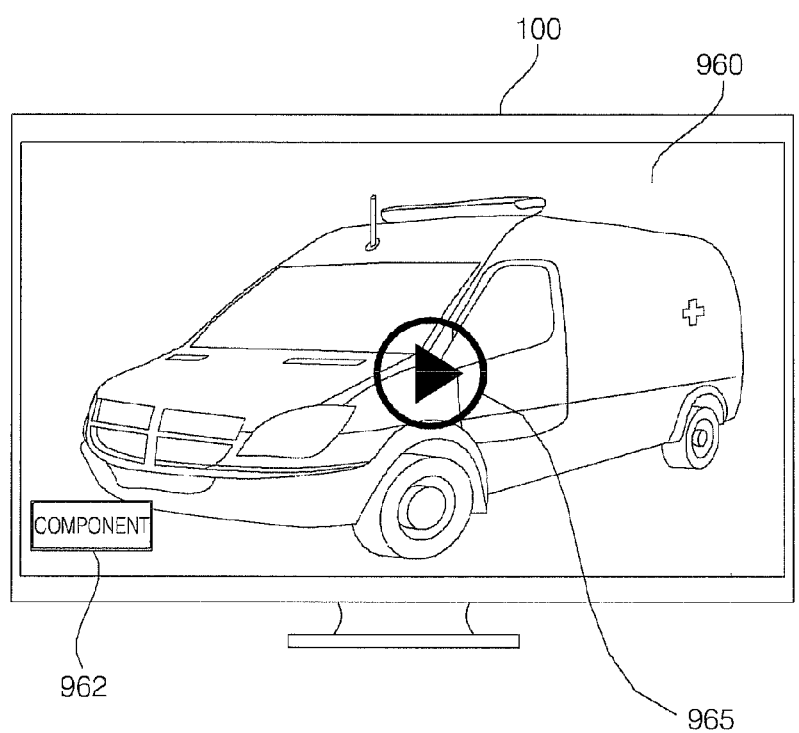

Then, an image received through the Component port corresponding to the selected component image may be displayed in full screen on the display 180, as illustrated in FIG. 9C.

FIG. 9C illustrates an exemplary display of a full Component image 960 being an enlarged version of the Component image 940 illustrated in FIG. 9B on the display 180. A play object 965 for playing back the Component image 960 and an object 962 indicating the Component port may further be displayed on the display 180.

Upon selection of the play object 965, the image display apparatus 100 may play back an image received through the Component port on the display 180.

FIGS. 10A to 10F illustrate another example of displaying per-input port images.

Figure 10A:
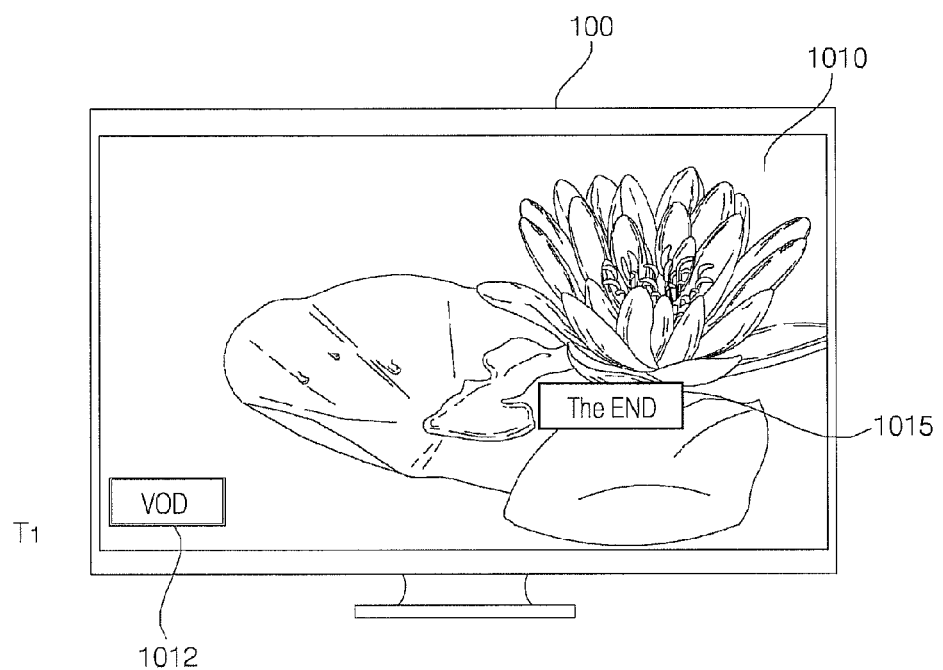

FIG. 10A illustrates exemplary display of a VOD image 1010 received through the VOD port at a first time T1. Upon completion of playback of the VOD image 1010, an object 1015 indicating the end of playback may be displayed. In addition, an object 1012 representing the VOD port may be displayed on the display 180.

Figure 10B:
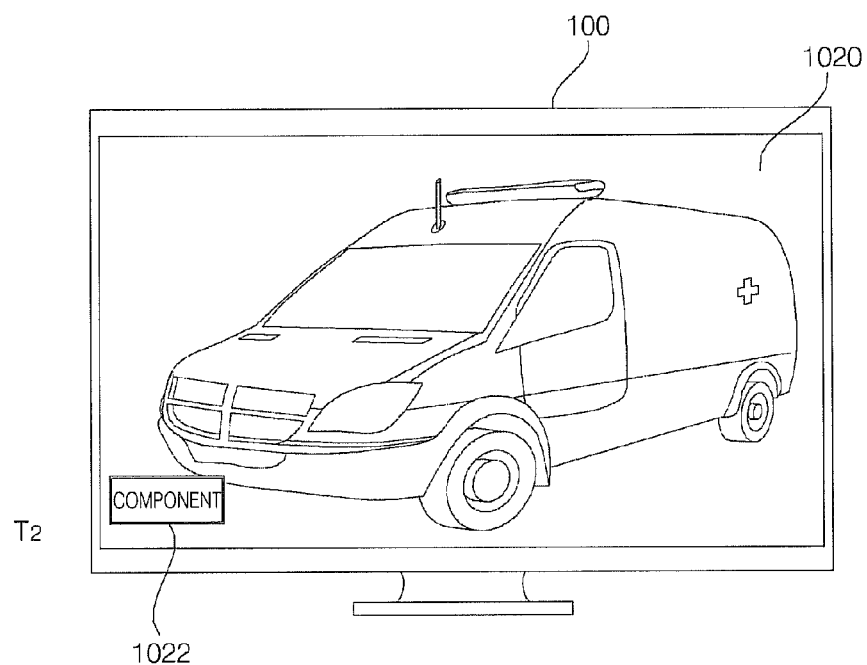

FIG. 10B illustrates exemplary display of a Component image 1020 received through the Component port at a second time T2. An object 1022 representing the Component port may further be displayed on the display 180.

Figure 10C:
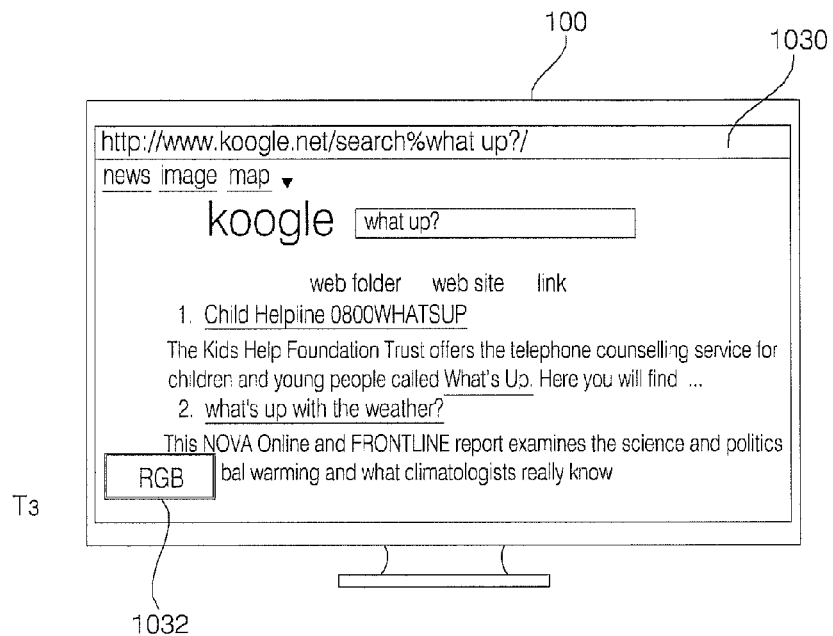

FIG. 10C illustrates exemplary display of an RGB image 1030 received through the RGB port at a third time T3. An object 1032 representing the RGB port may further be displayed on the display 180.

Figure 10D:
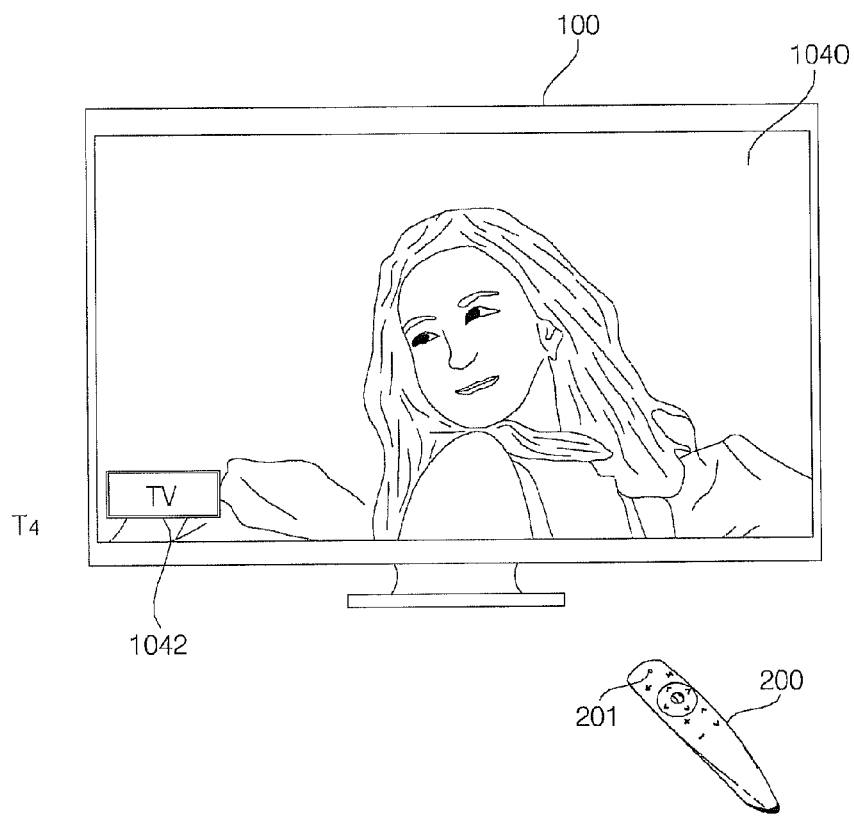

FIG. 10D illustrates exemplary display of a broadcast image 1040 received through the antenna port at a fourth time T4. An object 1042 representing the antenna port may further be displayed on the display 180.

Figure 10E:
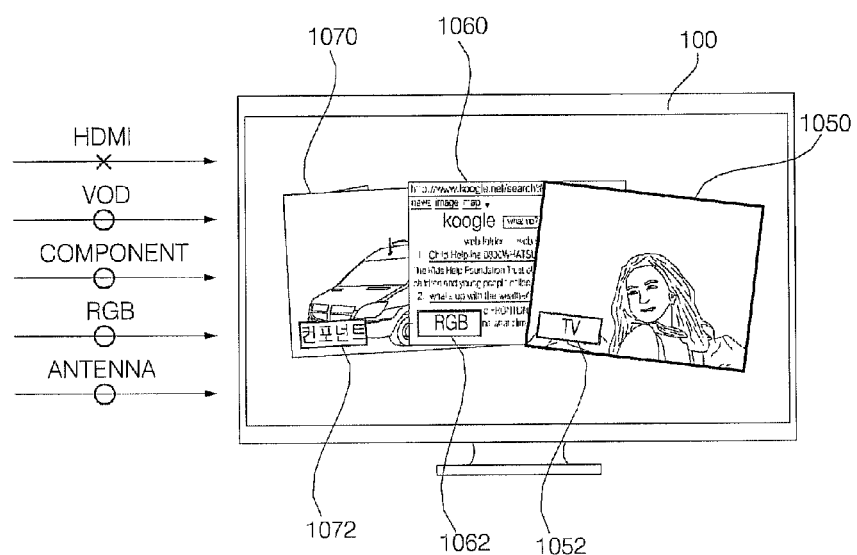

When the input key 201 of the remote controller 200 is manipulated, the three per-input port images may be displayed on the display 180 as illustrated in FIG. 10E. FIG. 10E illustrates exemplary sequential arrangement of a broadcast image 1050 at the foremost position, followed by an RGB image 1060 and a Component image 1070. The images 1050, 1060, and 1070 may include objects 1052, 1062, and 1072 representing the antenna port, the RGB port, and the Component port, respectively.

Compared to FIG. 9B, a VOD image is not displayed in FIG. 10E. In the case of an input port providing recorded images among a plurality of input ports, the controller 170 may control display of an image received through the input port on the display 180 as far as playback of the recorded images has not ended yet.

Since the VOD image 1010 is completely played back and thus no more VOD images remain to be played back in FIG. 10A, a VOD image may not be displayed on the display 180 despite reception of the per-input port image view input.

The per-input port images may be arranged in different orders from that illustrated in FIG. 10E. For example, priority may be given to the earliest reproduced image before the current input image.

Figure 10F:
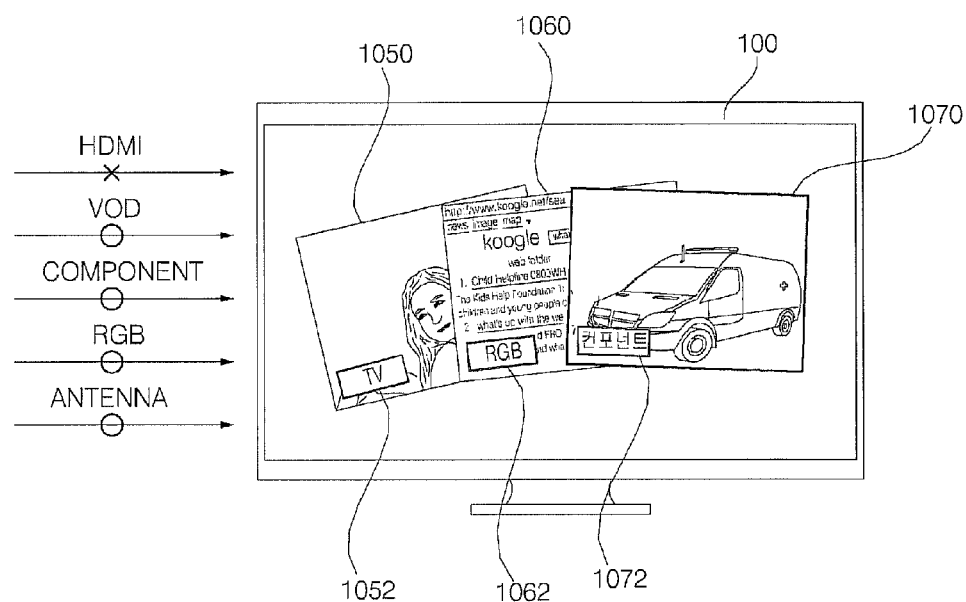

FIG. 10F illustrates an example in which the earliest reproduced Component image 1070 is placed at the foremost position, followed sequentially by the broadcast image 1050 and the RGB image 1060. The objects 1072, 1052, and 1062 representing the Component port, the antenna port, and the RGB port may be displayed over the images 1070, 1050, and 1060, respectively. Preferably, the images 1050, 1060 and 1070 may be arranged in order of earliest to latest reproduction. In this case, the Component image 1070 is placed at the foremost position, followed sequentially by the RGB image 1060 and the broadcast image 1050.

Unlike FIG. 10F, it is also possible to give a highest priority to an input image reproduced and displayed shortly before the current displayed input image. That is, the RGB image 1060 may be displayed at the foremost position.

FIGS. 11A to 11F illustrate another example of displaying per-input port images.

Figure 11A:
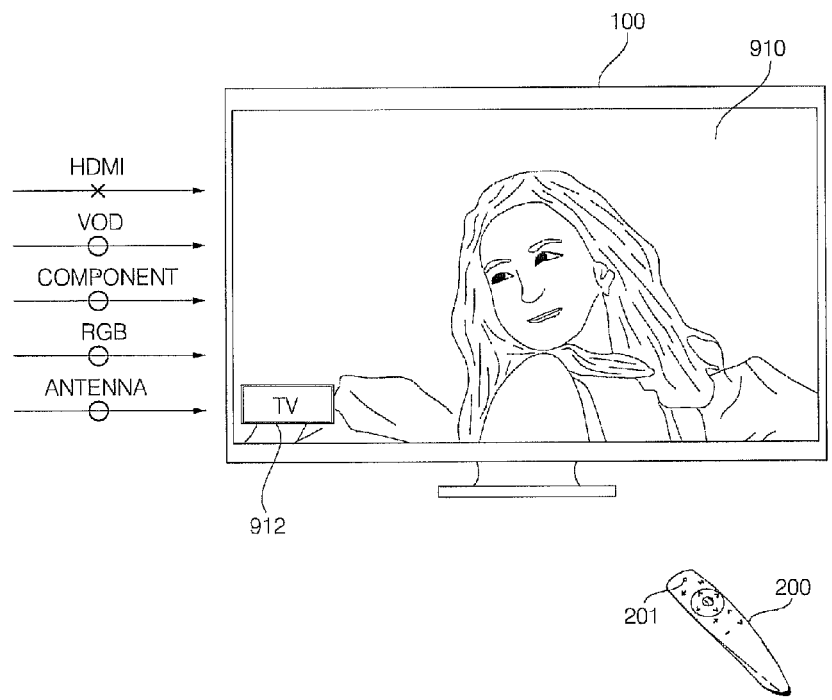

FIG. 11A illustrates exemplary display of the broadcast image 910 in the image display apparatus 100. The object 912 representing the antenna port may further be displayed on the display 180. In FIG. 11A, no image is received through the HDMI port, whereas input images are received through the VOD port, the Component port, the RGB port, and the antenna port. The input key 201 of the remote controller 200 is manipulated herein.

Figure 11B:
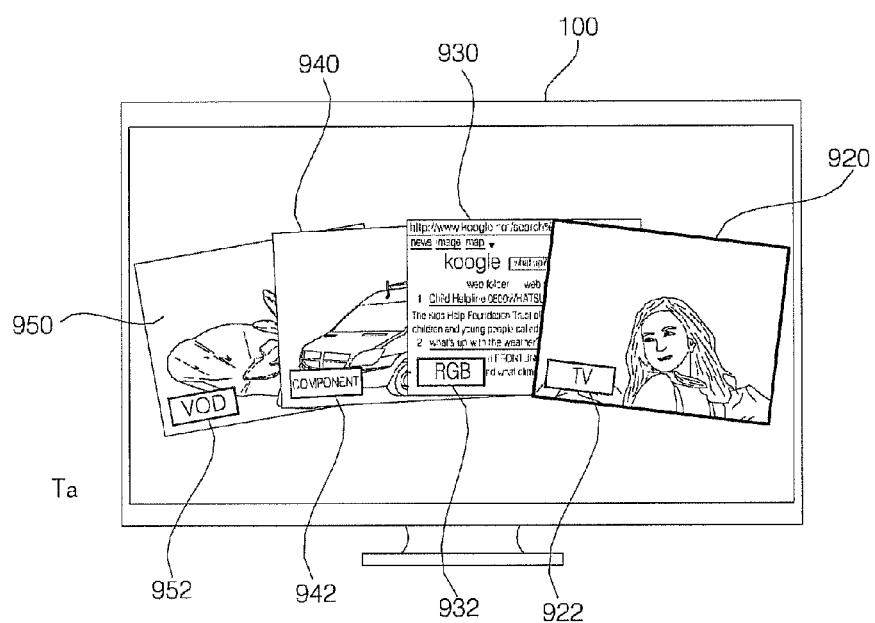

FIG. 11B illustrates an example in which the broadcast image 920 received through the antenna port, the RGB image 930 received through the RGB port, the Component image 940 received through the Component port, and the VOD image 950 received through the VOD port are displayed, partially overlapped with one another at time Ta according to a manipulation of the input key 201 of the remote controller 200 in such a manner that they can be distinguished from one another according to the input ports.

The broadcast image 920 is placed at the foremost position, highlighted, followed sequentially by the RGB image 930, the Component image 940, and the VOD image 950 in FIG. 11B.

The arrangement order of the per-input port images may be changed a predetermined time later.

Figure 11C:
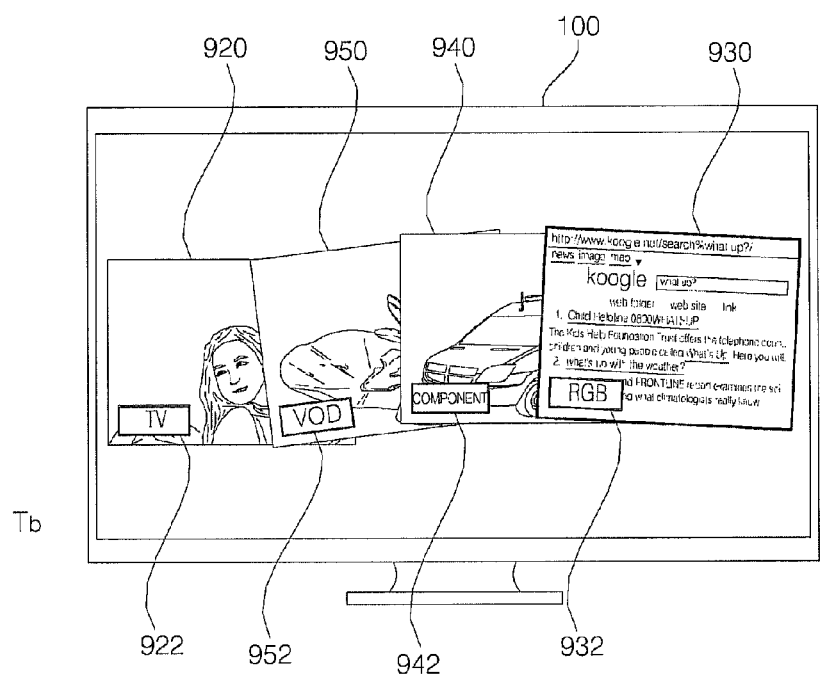

FIG. 11C illustrates an example in which the RGB image 930 is placed highlighted at the foremost position, followed sequentially by the Component image 940, the VOD image 950, and the broadcast image 920 at time Tb.

Figure 11D:
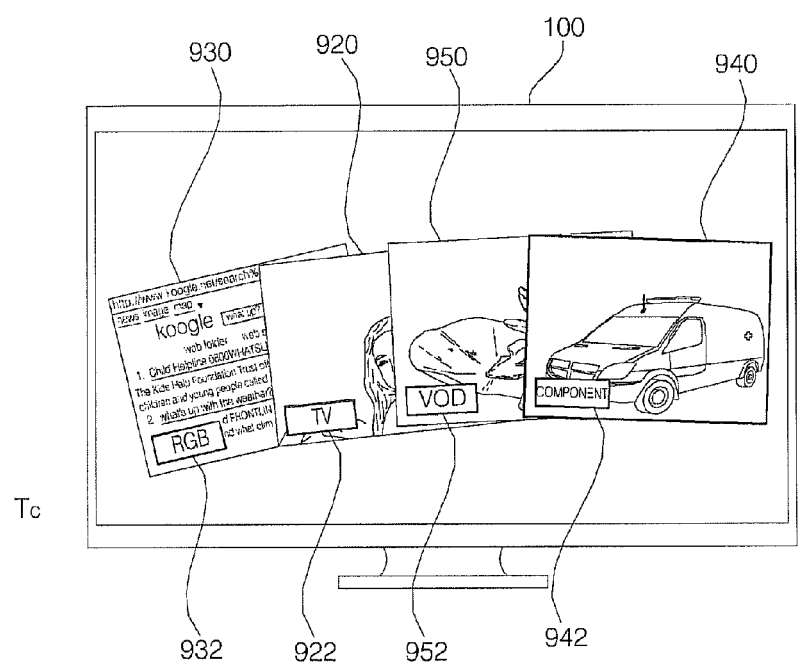
Figure 11E:
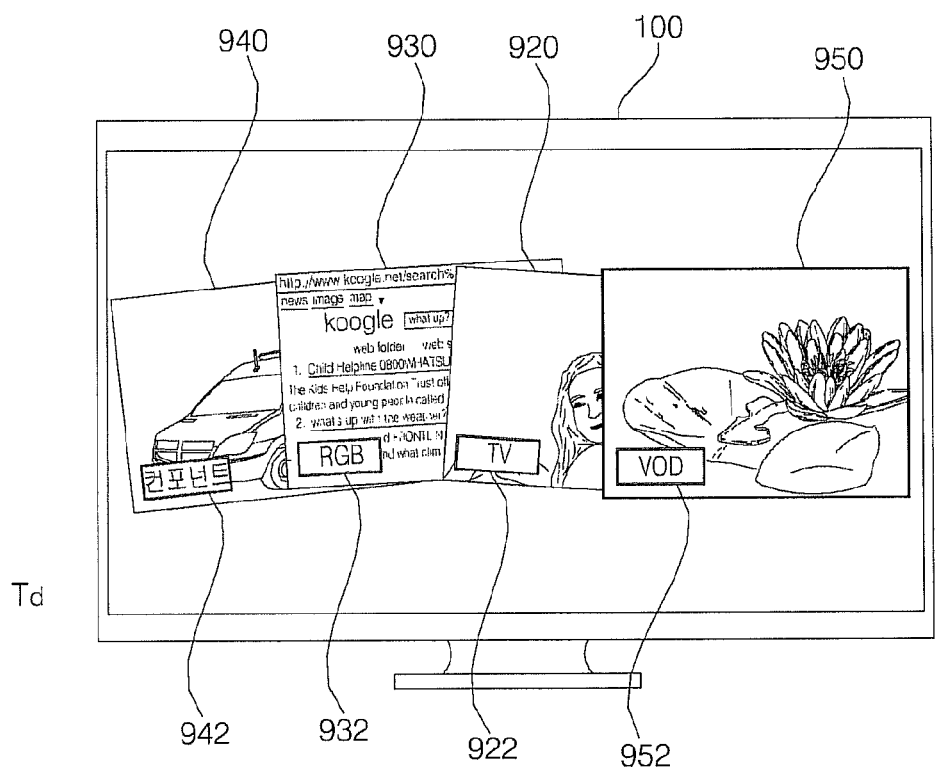
Figure 11F:
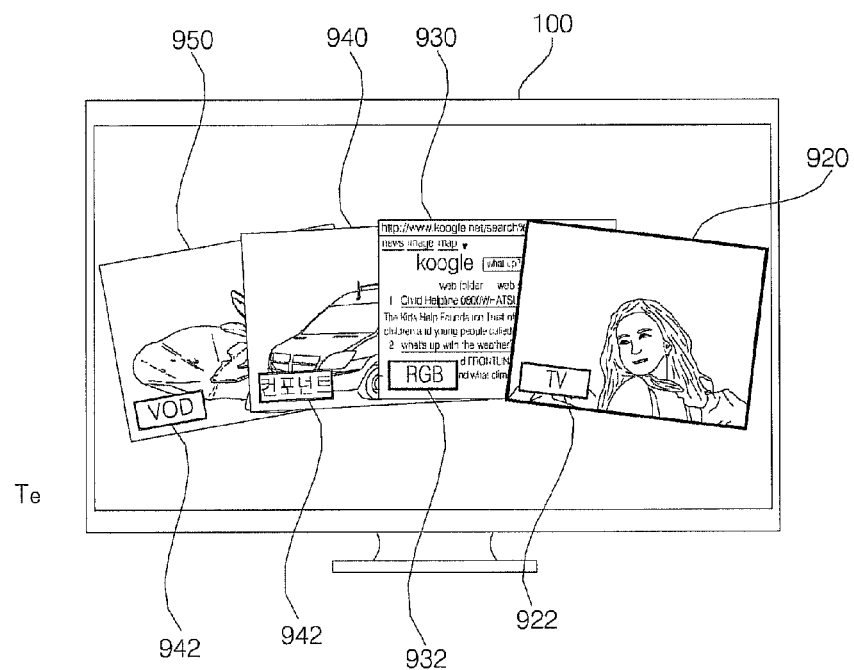

The component image 940 is placed at the foremost position at time Tc in FIG. 11D, the VOD image 950 is placed at the foremost position at time Td in FIG. 11E, and the broadcast image 920 returns to the foremost position at time Te in FIG. 11F.

As the arrangement order of per-input order images is changed with the passage of time, the user can select an image of an intended input port simply without any special operation, for example, just by pressing the OK key 203.

Figure 12A:
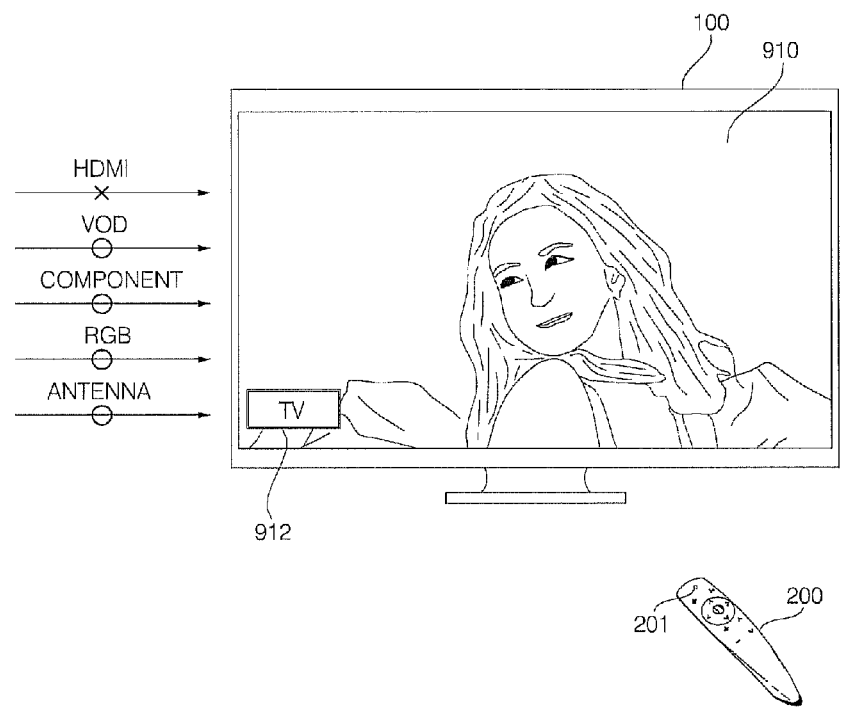
Figure 12B:
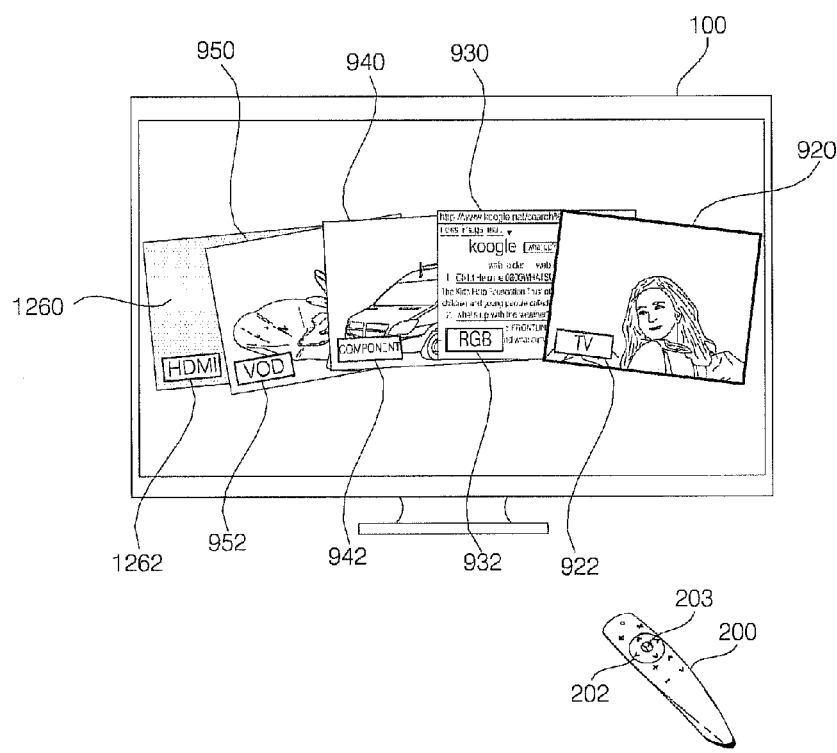
Figure 12C:
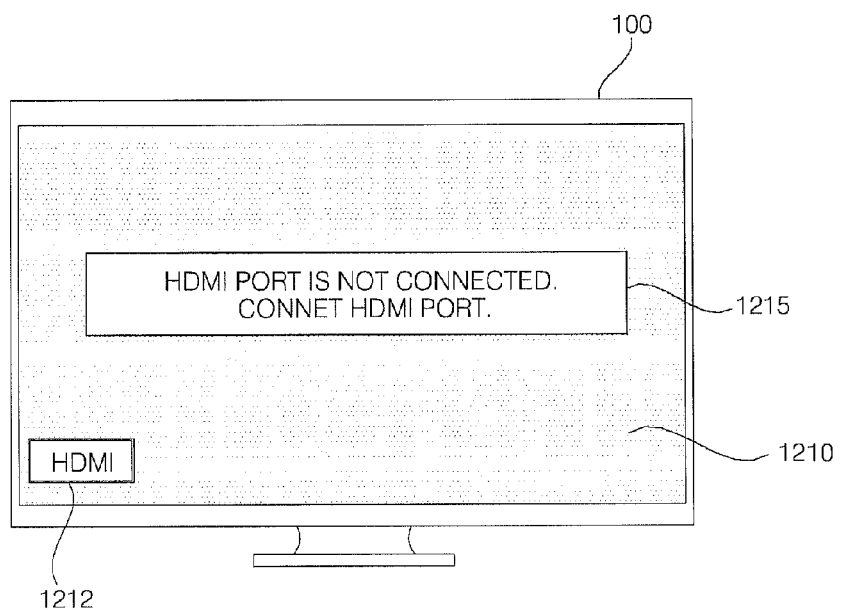

FIGS. 12A, 12B and 12C illustrate a further example of displaying per-input port images.

FIG. 12A illustrates exemplary display of the broadcast image 910 in the image display apparatus 100. The object 912 representing the antenna port may further be displayed on the display 180. In FIG. 12A, no image is received through the HDMI port, whereas input images are received through the VOD port, the Component port, the RGB port, and the antenna port. The input key 201 of the remote controller 200 is manipulated herein.

FIG. 12B illustrates an example in which the broadcast image 920 received through the antenna port, the RGB image 930 received through the RGB port, the Component image 940 received through the Component port, the VOD image 950 received through the VOD port, and an HDMI image 1260 received through the HDMI port are displayed, partially overlapped with one another according to a manipulation of the input key 201 of the remote controller 200 in such a manner that they can be distinguished from one another according to the input ports.

In FIG. 12B, upon receipt of a per-input port image view input, the image display apparatus 100 displays even an image corresponding to an unavailable external input port. Specifically, since the HDMI port is not connected, the HDMI image 1260 is shown as a blank image in FIG. 12C.

In FIG. 12B, the 'TV' object 922 representing the antenna port, the 'RGB' object 932 representing the RGB port, the 'Component' object 942 representing the Component port, the 'VOD' object 952 representing the VOD port, and an 'HDMI' object 1262 representing the HDMI port are displayed over the respective images 920, 930, 940, 950, and 1260.

Upon receipt of the HDMI image 1260 by the left directional key 202 and the OK key 203 of the remote controller 200, an object 1215 indicating that the HDMI port is not connected may be displayed over a blank image 1210 as illustrated in FIG. 12C. Therefore, the user can readily perceive that the HDMI port is not connected.

An object 1212 representing the HDMI port may further be displayed on the display 180.

As is apparent from the above description, upon receipt of a per-input port image view input, an image display apparatus can display images that are being received or that have been received on a per-input port basis so that they are distinguished from one another according to the input ports. Since input images are displayed simply in the image display apparatus in this manner, user convenience can be increased.

A plurality of per-input port images can be displayed overlapped with one another so that they are distinguished from one another according to the input ports. Thus, all of the per-input port images can be displayed at one time, thereby increasing user convenience.

Upon selection of one of the per-input port images, the selected image is full-screened, thereby enabling the user to view the input image easily.

In the case of an input port providing recorded images among the plurality of input ports corresponding to the displayed image, only when playback of the recorded images has not ended yet, the image display apparatus displays an image received through the input port. Accordingly, the user can readily identify an input image to view.

The image display apparatus and the method for operating the image display apparatus according to the foregoing exemplary embodiments are not restricted to the exemplary embodiments set forth herein. Therefore, variations and combinations of the exemplary embodiments set forth herein may fall within the scope of the present invention.

The method for operating the image display apparatus according to the foregoing exemplary embodiments may be implemented as code that can be written on a computer-readable recording medium and thus read by a processor in the portable terminal and the image display apparatus. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus, comprising:
   displaying an image;
   displaying per-input port images that are being received or have been received through a plurality of input ports on a per-input port basis so that the per-input port images are distinguished from one another according to the input ports, upon receipt of a per-input port image view input;

selecting one of the per-input port images; and displaying an image corresponding to an input port through which the selected per-input port image is being received or has been received, wherein, when displaying the per-input port images, the per-input port images are displayed overlapped with one another, wherein the per-input port images include objects indicating the input ports, and wherein each objects indicating the input ports are displayed in each per-input port images and are not overlapped with the other per-input port images.

2. The method according to claim 1, wherein the plurality of input ports through which the displayed per-input port images are being received or have been received are currently available input ports among input ports of the image display apparatus.

3. The method according to claim 1, wherein the displaying of per-input port images comprises displaying the per-input port images in order of the latest use.

4. The method according to claim 1, wherein at least one of the displayed per-input port images is a last reproduced image displayed in the image display apparatus.

5. The method according to claim 1, wherein in the presence of an input port providing recorded images among the plurality of input ports, the displaying of per-input port images comprises displaying an image corresponding to the input port, only when playback of the recorded image has not ended yet through the input port.

6. The method according to claim 1, wherein the per-input port images include at least one of an High Definition Multimedia Interface (HDMI) image, a broadcast image, a Component image, a Red, Green, Blue (RGB) image, or a Video ON Demand (VOD) image.

7. The method according to claim 1, wherein each of the per-input port images is smaller than the first image.

8. The method according to claim 1, wherein an image that is being received or has been received through an input port corresponding to the first image is highlighted.

9. The method according to claim 8, wherein the image that is being received or has been received through the input port corresponding to the first image has at least one of a largest size, a largest periphery thickness, or a highest brightness, or is placed at a foremost position.

10. The method according to claim 1, further comprising storing final images received through the input ports and reproduced in the image display apparatus, wherein the per-input port images are final images except for a currently viewed image.

11. The method according to claim 1, further comprising:

when an input port among the plurality of input ports is unavailable, displaying a blank image as the per-input port image corresponding to the unavailable input port, wherein the blank image includes an object indicating the unavailable input port.

12. An image display apparatus comprising:

a display to display a first image;

an interface unit having a first plurality of input ports, to receive per-input port images through a second plurality of input ports; and a controller to upon receipt of a per-input port image view input, control display of per-input port images that are being received or have been received through the second plurality of input ports on a per-input port basis so that the per-input port images are distinguished from one another according to the input ports, and when one of the per-input port images is selected, to control display of an image corresponding to an input port through which the selected per-input port image is being received or has been received, wherein, when the controller controls the display of the per-port images, the per-input port images are displayed overlapped with one another, wherein the per-input port images include objects indicating the input ports, and wherein each objects indicating the input ports are displayed in each per-input port images and are not overlapped with the other per-input port images.

13. The image display apparatus according to claim 12, wherein the second plurality of input ports through which the per-input port images are being received or have been received are currently available input ports among the first plurality of input ports of the interface unit.

14. The image display apparatus according to claim 12, wherein the display displays the per-input port images in order of the latest use.

15. The image display apparatus according to claim 12, further comprising a memory to store last reproduced images displayed in the image display apparatus, wherein the display displays a last reproduced image stored in the memory as at least one of the per-input port images.

16. The image display apparatus according to claim 12, wherein in the presence of an input port providing recorded images among the plurality of input ports, the display displays an image corresponding to the input port, only when playback of the recorded image has not ended yet through the input port.

17. The image display apparatus according to claim 12, wherein the display highlights an image that is being received or has been received through an input port corresponding to the first image.

18. The image display apparatus according to claim 17, wherein the display displays the image that is being received or has been received through the input port corresponding to the first image in at least one of a largest size, a largest periphery thickness, or a highest brightness, or the display places the image at a foremost position.

19. The image display apparatus according to claim 12, further comprising a memory to store final images received through the input ports and reproduced in the image display apparatus, wherein the display displays a currently viewed image and final images stored in the memory as the per-input port images.

20. The image display apparatus according to claim 12, wherein, when an input port among the plurality of input ports is unavailable, a blank image is displayed as the per-input port image corresponding to the unavailable input port, wherein the blank image includes an object indicating the unavailable input port.

* * * * *